United States Patent
Kang et al.

(10) Patent No.: US 7,382,822 B2
(45) Date of Patent: Jun. 3, 2008

(54) CODE ACQUISITION DEVICE AND METHOD USING TWO-STEP SEARCH PROCESS IN DS-CDMA UWB MODEM

(75) Inventors: Bub Joo Kang, Taejon (KR); Kyu Min Kang, Taejon (KR); Sangsung Choi, Taejon (KR); Kwang Roh Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 576 days.

(21) Appl. No.: 11/063,583

(22) Filed: Feb. 24, 2005

(65) Prior Publication Data

US 2006/0093021 A1 May 4, 2006

(30) Foreign Application Priority Data

Nov. 3, 2004 (KR) ...................... 10-2004-0088764

(51) Int. Cl.
*H04B 1/00* (2006.01)
(52) U.S. Cl. ...................... 375/150; 375/130; 375/140; 375/141; 375/147; 375/149; 375/342; 370/322
(58) Field of Classification Search ................ 375/147, 375/148, 149, 150, 151, 152, 153, 140; 370/130, 370/141, 322, 342
See application file for complete search history.

(56) References Cited

U.S. PATENT DOCUMENTS

| | | | |
|---|---|---|---|
| 6,700,939 B1* | 3/2004 | McCorkle et al. | 375/295 |
| 6,763,057 B1* | 7/2004 | Fullerton et al. | 375/141 |
| 6,931,078 B2* | 8/2005 | McCorkle et al. | 375/295 |
| 7,164,720 B2* | 1/2007 | Molisch et al. | 375/256 |
| 2004/0136439 A1* | 7/2004 | Dewberry et al. | 375/130 |
| 2004/0161064 A1* | 8/2004 | Brethour et al. | 375/347 |
| 2005/0013387 A1* | 1/2005 | Ojard | 375/316 |
| 2005/0089083 A1* | 4/2005 | Fisher et al. | 375/130 |
| 2005/0105505 A1* | 5/2005 | Fishler et al. | 370/349 |

FOREIGN PATENT DOCUMENTS

| KR | 1020020049166 | 6/2002 |
|---|---|---|
| KR | 1020000077117 | 12/2002 |

* cited by examiner

*Primary Examiner*—Shuwang Liu
*Assistant Examiner*—Kenneth Lam
(74) *Attorney, Agent, or Firm*—Lowe Hauptman Ham & Berner LLP

(57) ABSTRACT

There is provided a code acquisition device and method using a two-step search process in a DS-CDMA UWB modem. The device includes: an I/Q channel symbol generating unit for, generating a plurality (i) of $n_{th}$ I/Q channel symbols in a first search process and generating a plurality of $n_{th}$ I/Q channel symbols in a second search process; a spread code selecting unit for receiving the plurality of $n_{th}$ I/Q channel symbols in the first search process; an $N_{NC2}N_S$ tap I/Q channel symbol matched filter unit for, in the second search process, receiving the plurality (i) of $n_{th}$ I/Q channel symbols; a switching unit for changing to a closed state of the second search process; and a super frame and symbol boundary time deciding unit for deciding a super frame time and a symbol boundary time.

23 Claims, 4 Drawing Sheets

FIG. 4

| CODE SET NUMBER | SPREAD CODE |
|---|---|
| 1 | -1, 0, 1, -1, -1, -1, 1, 1, 0, 1, 1, 1, 1, -1, 1, -1, 1, 1, 1, -1, 1, -1, -1, 1 |
| 2 | -1, -1, -1, -1, 1, -1, 1, -1, 1, -1, -1, 1, -1, 1, 1, -1, -1, 1, 1, 0, -1, 0, 1, 1 |
| 3 | -1, 1, -1, -1, 1, -1, -1, 1, -1, 0, -1, 0, -1, -1, 1, 1, 1, -1, 1, 1, 1, -1, -1, -1 |
| 4 | 0, -1, -1, -1, -1, -1, -1, 1, 1, 0, -1, 1, 1, -1, 1, -1, -1, 1, 1, -1, 1, -1, 1, -1 |
| 5 | -1, 1, -1, 1, 1, -1, 1, 0, 1, 1, 1, -1, -1, 1, 1, -1, 1, 1, 1, -1, -1, -1, 0, -1 |
| 6 | 0, -1, -1, 0, 1, -1, -1, 1, -1, -1, 1, 1, 1, 1, -1, -1, 1, -1, 1, -1, 1, 1, 1, 1 |

CODE ACQUISITION DEVICE AND METHOD USING TWO-STEP SEARCH PROCESS IN DS-CDMA UWB MODEM

BACKGROUND OF THE INVENTION

1. Field of the Invention

The present invention relates to a code acquisition device and method using a two-step search process in a Direct Sequence-Code Division Multiple Access (DS-CDMA) Ultra Wide Band (UWB) modem, and more particularly, to a code acquisition device and method using a two-step search process in a DS-CDMA UWB modem in which when a beacon frame synchronization being a super-frame timing synchronization is performed, twenty-four noncoherent correlators are used in a first search process to search for an allocation code allocated to a piconet, and a spread code sequence searched in the first search process is used in a second search process to concurrently decide a super frame time (packet code) and a symbol boundary time (firstly received path).

2. Description of the Related Art

As well known, in a conventional DS-CDMA system, pilot signals all having patterns of "0" can be always radiated from a base station, and if code synchronization is acquired through the pilot signal, a reception packet time of a type allocated to a PN code chip clock is automatically acquired. Accordingly, in a conventional DS-CDMA system of Data Communication Network (DCN), Personal Communication Services (PCS), International Mobile Telecommunications-2000 (IMT-2000), if only the code synchronization is acquired, a relation of a period of a PN code sequence, a chip duration and the like can be used to acquire a packet synchronization.

However, unlike the conventional DS-CDMA system, in a DS-CDMA UWB modem of IEEE 802.15.3a, when a device belonging to a piconet is turned on, the device should primarily receive a beacon frame to communicate with a piconet coordinator. Before the reception, code synchronization is performed between a spread code sequence received from the piconet coordinator and a spread code sequence generated from a device receiver. Additionally, since a spread code of the piconet relating to the code synchronization, a packet synchronization (super frame time decision), and a symbol boundary time for allocating a code phase to a plurality of fingers should be searched within a determined preamble duration, a code synchronization acquisition process should be necessarily performed at a high speed.

However, a device and method for performing a code synchronization acquisition at the high speed in the DS-CDMA UWB modem of the IEEE 802.15.3a has not been developed. Just only analogous type of searcher is embodied by Motorola Corporation, but a digital type of searcher for a reception signal does not have ever been proposed before. Accordingly, there is a drawback in that it is difficult to perform a communication between the device belonging to the piconet and the piconet coordinator due to the absence of a kernel technology of the DS-CDMA UWB modem.

SUMMARY OF THE INVENTION

Accordingly, the present invention is directed to a code acquisition device and method using a two-step search process in a Direct Sequence-Code Division Multiple Access (DS-CDMA) Ultra Wide Band (UWB) modem, which substantially obviates one or more problems due to limitations and disadvantages of the related art.

It is an object of the present invention to provide a code acquisition device and method using a two-step search process in a DS-CDMA UWB modem in which when a beacon frame synchronization being a super frame timing synchronization is performed, twenty-four noncoherent correlators are used in a first search process to search an allocation code allocated to a Piconet, and a spread code sequence searched in the first search process is used in a second search process to concurrently decide a super frame time (packet code) and a symbol boundary time (firstly received path), thereby allowing a communication between a device belonging to a piconet and a piconet coordinator.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a code acquisition device using a two-step search process in a Direct Sequence-Code Division Multiple Access (DS-CDMA) Ultra Wide Band (UWB) modem, the device including: an I/Q channel symbol generating unit for, in a first search process, generating a plurality (i) of $n_{th}$ I/Q channel symbols ($Y_{I,n}(i)$, $Y_{Q,n}(i)$) consistent with a plurality (i) of code phases for a multi-path reception signal (r(t)) by using six spread code sequences, and in a second search process, generating a plurality of $n_{th}$ I/Q channel symbols ($Y_{I,n}(i)$, $Y_{Q,n}(i)$) consistent with a plurality (i) of code phases for the multi-path reception signal (r(t)) by using a spread code having a maximal value among six spread codes acquired in the first search process; a spread code selecting unit for, in the first search process, receiving the plurality of $n_{th}$ I/Q channel symbols ($Y_{I,n}(i)$, $Y_{Q,n}(i)$) from the I/Q channel symbol generating unit to respectively combine the received channel symbols ($Y_{I,n}(i)$, $Y_{Q,n}(i)$) at $N_{NC1}$ times, and summing the combined result value ($Z_i$) at each of the six spread codes to generate six symbol energies ($E_m$, m=1,2, . . . , 6) consistent with the six spread codes, and deciding the spread code having the maximal value among the six symbol energies ($E_m$, m=1,2, . . . , 6), as a spread code of a piconet coordinator; an $N_{NC2}N_S$ tap I/Q channel symbol matched filter unit having an $N_s$-length taps and for, in the second search process, receiving the plurality (i) of $n_{th}$ I/Q channel symbols ($Y_{I,n}(i)$, $Y_{Q,n}(i)$) from the I/Q channel symbol generating unit to generate a result value ($S_{n,k}(i)$) through a predetermined arithmetic operation, and performing a noncoherent combining to the result value ($S_{n,k}(i)$) at $N_{NC2}$ times to output an arbitrary result value ($X_n(i)$); a switching unit disposed between the I/Q channel symbol generating unit and the $N_{NC2}N_S$ tap I/Q channel symbol matched filter unit, for changing an opened state of the first search process to a closed state of the second search process to connect the I/Q channel symbol generating unit with the $N_{NC2}N_S$ tap I/Q channel symbol matched filter unit; and a super frame and symbol boundary time deciding unit for deciding a super frame time (packet synchronization) and a symbol boundary time (firstly received path) by using output values (Xn(i)) of the plurality of $N_{NC2}N_S$ tap I/Q channel symbol matched filters in the second search process.

In another aspect of the present invention, there is provided a code acquisition method using a two-step search process in a Direct Sequence-Code Division Multiple Access (DS-CDMA) Ultra Wide Band (UWB) modem, the method including: a step 10 of generating a plurality (i) of $n_{th}$ I/Q channel symbols ($Y_{I,n}(i)$, $Y_{Q,n}(i)$) consistent with a plurality (i) of code phases for a multi-path reception signal (r(t)) by using six spread code sequences; a step 20 of respectively combining the plurality of $n_{th}$ I/Q channel symbols ($Y_{I,n}(i)$, $Y_{Q,n}(i)$) at $N_{NC1}$ times, and summing the combined result value ($Z_i$) at each of six spread codes to generate six symbol energies ($E_m$, m=1,2, ..., 6) consistent with the six spread codes, and deciding the spread code having a maximal value among the six symbol energies ($E_m$, m=1,2, ..., 6), as a spread code of a piconet coordinator; a step 30 of generating a plurality (i) of $n_{th}$ I/Q channel symbols ($Y_{I,n}(i)$, $Y_{Q,n}(i)$) consistent with a plurality (i) of code phases for the multi-path reception signal (r(t)) by using the spread code having the maximal value among the six spread codes; a step 40 of respectively performing an arithmetic operation for the plurality of $n_{th}$ I/Q channel symbols ($Y_{I,n}(i)$, $Y_{Q,n}(i)$) to generate the result value ($S_{n,k}(i)$), and respectively performing the noncoherent combining to the result value ($S_{n,k}(i)$) at $N_{NC2}$ times to generate an arbitrary result value ($X_n(i)$); and a step 50 of deciding a super frame time (packet synchronization) and a symbol boundary time (firstly received path) by using the generated result value (Xn(i)) obtained through the step 40.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 4 is a reference view illustrating a spread code having a code length of 24 according to the present invention.

DETAILED DESCRIPTION OF THE INVENTION

Reference will now be made in detail to the preferred embodiments of the present invention, examples of which are illustrated in the accompanying drawings.

Figure 1:
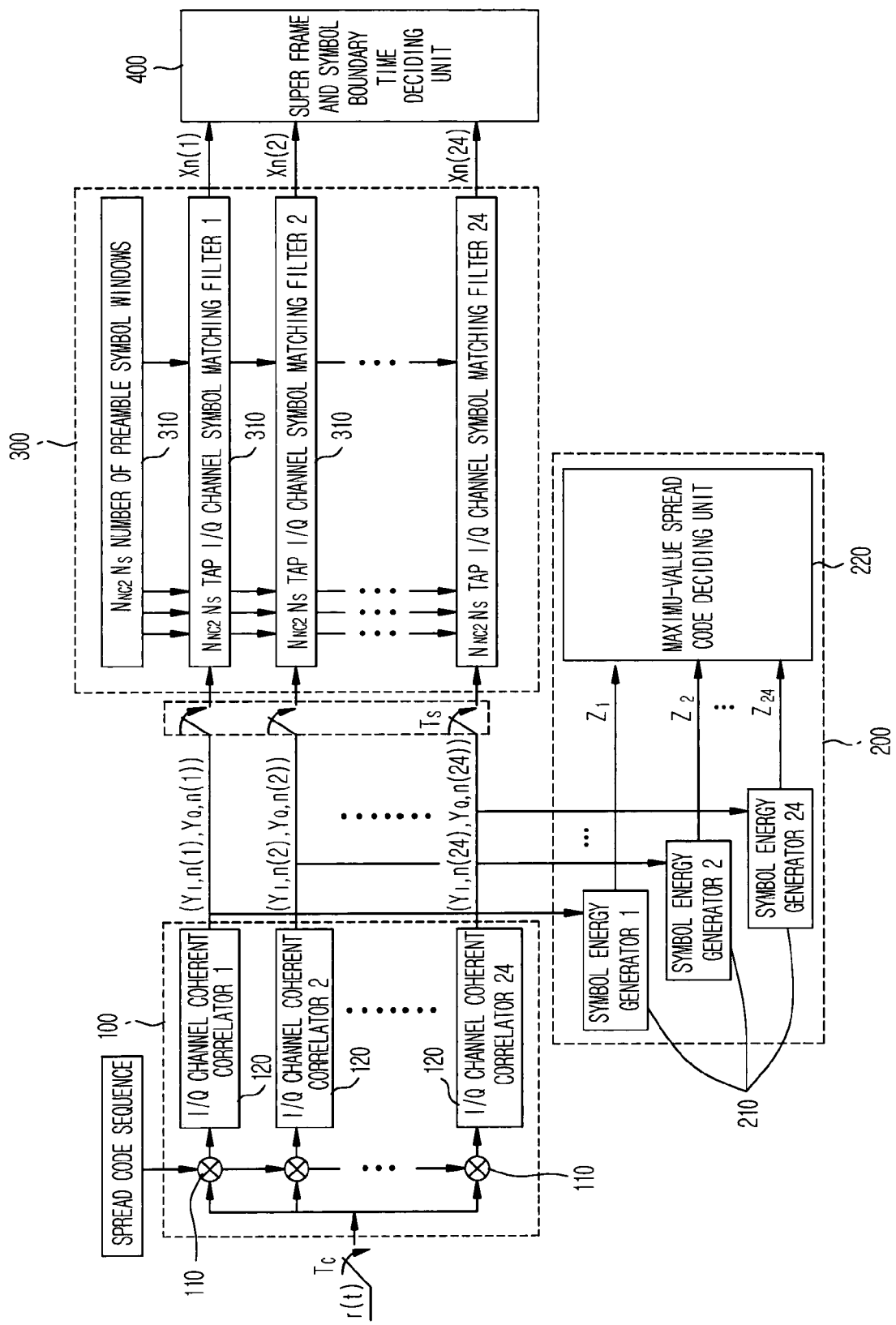
FIG. 1 is a functional block diagram illustrating a code acquisition device using a two-step search process in a DS-CDMA UWB modem according to a preferred embodiment of the present invention.

FIG. 1 is a functional block diagram illustrating a code acquisition device using a two-step search process in a DS-CDMA UWB modem according to a preferred embodiment of the present invention.

The code acquisition device includes an I/Q channel symbol generating unit 100; a spread code selecting unit 200; a $N_{NC2}N_S$ tap I/Q channel symbol matched filter unit 300; a switching unit 400; and a super frame and symbol boundary time deciding unit 500.

The I/Q channel symbol generating unit 100 uses six spread code sequences of FIG. 4 in a first search process to generate twenty-four $n_{th}$ I/Q channel symbols ($Y_{I,n}(i)$, $Y_{Q,n}(i)$) consistent with twenty-four code phases for a multi-path reception signal (r(t)), and uses a spread code having a maximal value among six spread codes acquired in the first search process, to generate twenty-four $n_{th}$ I/Q channel symbols ($Y_{I,n}(i)$, $Y_{Q,n}(i)$) consistent with the twenty-four code phases for the multi-path reception signal (r(t)). As shown in FIG. 1, the I/Q channel symbol generating unit 100 is comprised of twenty-four multipliers 110 and twenty-four I/Q channel coherent correlators 120. Hereinafter, "i" denotes 1, ..., 24.

At this time, the twenty-four multipliers 110 of the I/Q channel symbol generating unit 100 respectively multiply the multi-path reception signal (r(t)), which is sequentially delayed by one PN chip period ($T_c$), by the six spread code sequences in the first search process.

Further, the twenty-four I/Q channel coherent correlators 120 of the I/Q channel symbol generating unit 100 respectively generate the twenty-four $n_{th}$ I/Q channel symbols ($Y_{I,n}(i)$, $Y_{Q,n}(i)$) consistent with the twenty-four code phases on the basis of a result value of the twenty-four multipliers 110 in the first search process, and uses the spread code having the maximal value among the six spread codes acquired through the spread code selecting unit 200 in the first search process, to respectively generate the twenty-four $n_{th}$ I/Q channel symbols ($Y_{I,n}(i)$, $Y_{Q,n}(i)$) consistent with the twenty-four code phases for the multi-path reception signal (r(t)) in the second process.

At this time, the multi-path reception signal (r(t)) and the code phases, which are consistent with the twenty-four I/Q channel coherent correlators 120, have a relation wherein the code phases are allocated from a remainder of the plurality of (i) I/Q channel coherent correlators which include a second (i) I/Q channel coherent correlator 120 to a last (i) I/Q channel coherent correlator 120, and are sequentially delayed by one PN chip period ($T_c$), with respect to the code phase of a path received at the first I/Q channel coherent correlator 120.

Meanwhile, in the first search process, the spread code selecting unit 200 receives the twenty-four $n_{th}$ I/Q channel symbols ($Y_{I,n}(i)$, $Y_{Q,n}(i)$) from the twenty-four I/Q channel coherent correlators 120 of the I/Q channel symbol generating unit 100 to respectively combine the received channel symbols at $N_{NC1}$ times, and then sums the combined result value ($Z_i$, i=1, 2, ...,24) at each of six spread codes to generate six symbol energies ($E_m$, m=1,2, ..., 6) consistent with the six spread codes, and then decides the spread code having the maximal value among six symbol energies ($E_m$, m=1,2, ..., 6), as a spread code of a piconet coordinator. The spread code selecting unit 200 is comprised of twenty-four symbol energy generators 210 and a maximum-value spread code deciding unit 220.

At this time, in the first search process, the twenty-four symbol energy generators 210 of the spread code selecting unit 200 respectively receive the twenty-four $n_{th}$ I/Q channel symbols ($Y_{I,n}(i)$, $Y_{Q,n}(i)$) from the twenty-four I/Q channel coherent correlators 120 of the I/Q channel symbol generating unit 100 to respectively combine the received channel symbols $(Y_{I,n}(i), Y_{Q,n}(i))$ at $N_{NC1}$ times, and then respectively output the combined result value $(Z_i, i=1, 2, \ldots, 24)$ Further, the maximum-value spread code deciding unit 220 of the spread code selecting unit 200 sums the result value $(Z_i, i=1, 2, \ldots, 24)$ of the twenty-four symbol energy generators 210 at each of the six spread codes to generate the symbol energies $(E_m, m=1, 2, \ldots, 6)$ consistent with the six spread codes, and then decides the spread code having the maximal value among the six symbol energies $(E_m, m=1, 2, \ldots, 6)$, as the spread code of the piconet coordinator.

At this time, the result value $(Z_i, i=1, 2, \ldots, 24)$ of the twenty-four symbol energy generators 210 can be calculated in the following Equation 1:

$$\sum_{n=1}^{N_{ncl}} [Y_{I,n}^2(i) + Y_{Q,n}^2(i)] \quad \text{[Equation 1]}$$

$$(i = 1, 2, \ldots, 24)$$

Further, the symbol energies $(E_m, m=1, 2, \ldots, 6)$ consistent with the six spread codes generated through the maximum-value spread code deciding unit 220 can be calculated in the following Equation 2:

$$E_m = \sum_{i=1}^{24} Z_i \quad \text{[Equation 2]}$$

$$(m = 1, 2, \ldots, 6)$$

Meanwhile, in the second search process, the $N_{NC2}N_S$ tap I/Q channel symbol matched filter unit 300 having an $N_s$-length taps receives the twenty-four $n_{th}$ I/Q channel symbols $(Y_{I,n}(i), Y_{Q,n}(i))$ from the twenty-four I/Q channel coherent correlators 120 of the I/Q channel symbol generating unit 100 to generate a result value $(S_{n,k}(i))$ by using a coherent summation of the $N_s$ number of symbols, and then performs noncoherent combining to the result value $(S_{n,k}(i))$ at $N_{NC2}$ times to output an arbitrary result value $(X_n(i))$. As shown in FIG. 1, the $N_{NC2}N_S$ tap I/Q channel symbol matched filter unit 300 is comprised of twenty-four $N_{NC2}N_S$ tap I/Q channel symbol matched filters 310.

Figure 2:
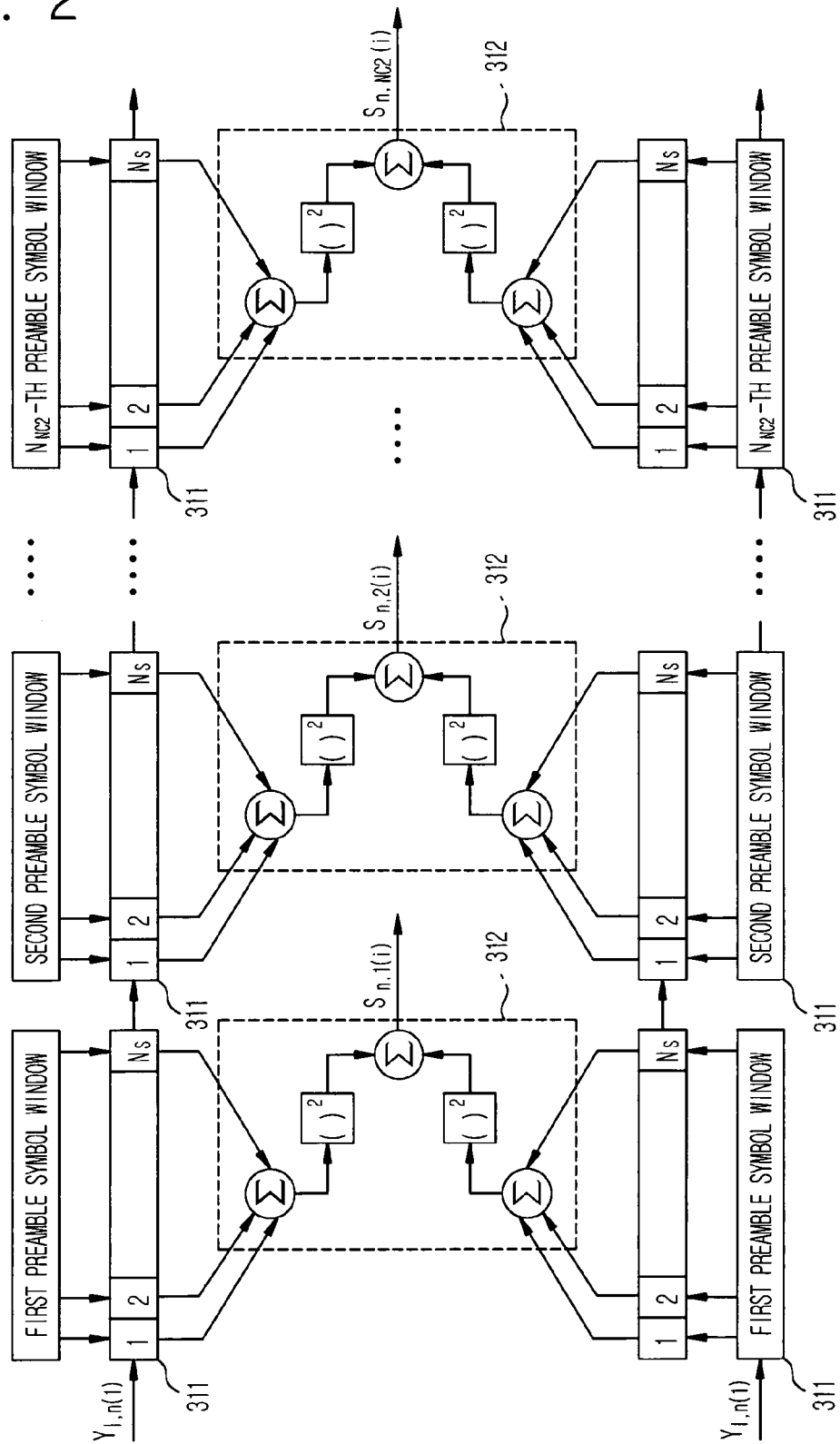
FIG. 2 is a detailed view illustrating a construction of a first $N_{NC2}N_S$ tap I/Q channel symbol matched filter in a code acquisition device using a two-step search process in a DS-CDMA UWB modem of FIG. 1.

At this time, in the second search process, the twenty-four $N_{NC2}N_S$ tap I/Q channel symbol matched filters 310 having the $N_s$-length taps respectively receive the twenty-four $n_{th}$ I/Q channel symbols $(Y_{I,n}(i), Y_{Q,n}(i))$ from the twenty-four I/Q channel coherent correlators 120 of the I/Q channel symbol generating unit 100 to generate the result value $(S_{n,k}(i))$ by using the coherent summation of the $N_s$ number of symbols, and then respectively perform the noncoherent combining to the result value $(S_{n,k}(i))$ at $N_{NC2}$ times to generate the arbitrary result value $(X_n(i))$. As shown in FIG. 2, the $N_{NC2}N_S$ tap I/Q channel symbol matched filters 310 are respectively comprised of a reception symbol forming unit 311 and an arithmetic processing unit 312.

At this time, the reception symbol forming units 311 respectively installed in the twenty-four $N_{NC2}N_S$ tap I/Q channel symbol matched filters 310 receive the $n_{th}$ I/Q channel symbol $(Y_{I,n}(i), Y_{Q,n}(i))$, and then use a preamble symbol designated to the $N_s$-length taps to eliminate a sign component stored in the $N_s$ number of the taps, thereby forming the $N_s$ number of reception symbols.

Further, the arithmetic processing units 312 respectively installed in the twenty-four $N_{NC2}N_S$ tap I/Q channel symbol matched filters 310 obtain the coherent summation of the $N_s$ number of reception symbols of the reception symbol forming units 311 and then, multiply the obtained coherent summation by an I/Q channel component and sum the multiplied result to output the result value $(S_{n,k}(i))$, thereby eliminating an effect of a phase component.

Accordingly, the twenty-four $N_{NC2}N_S$ tap I/Q channel symbol matched filters 310 respectively perform the non-coherent combining to the result value $(S_{n,k}(i))$ of the arithmetic processing unit 312 at $N_{NC2}$ times to generate and output the arbitrary result value $(X_n(i))$ to the super frame and symbol boundary time deciding unit 500.

At this time, since the $N_s$ value is a length of coherent summation, it is selected as an optimal value by performing a performance simulation depending on a channel environment in consideration of a frequency error, a probability of signal detection, and a code acquisition time.

Further, the result value $(S_{n,k}(i))$ of the arithmetic processing unit 312 can be calculated in the following Equation 3:

$$S_{n,k}(i) = \left(\sum_{m=1}^{N_S} Y_{I,n-mk}(i)\right)^2 + \left(\sum_{m=1}^{N_S} Y_{Q,n-mk}(i)\right)^2, \quad \text{[Equation 3]}$$

$$i = 1, 2, \ldots 24, k = 1, 2, \ldots, N_{NC2}$$

Additionally, each result value $(X_n(i))$ of the twenty-four $N_{NC2}N_S$ tap I/Q channel symbol matched filters 310 can be calculated in the following Equation 4:

$$X_n(i) = \sum_{k=1}^{N_{NC2}} \left[\left(\sum_{m=1}^{N_S} Y_{I,n-mk}(i)\right)^2 + \left(\sum_{m=1}^{N_S} Y_{Q,n-mk}(i)\right)^2\right], \quad \text{[Equation 4]}$$

$$i = 1, 2, \ldots, 24$$

Meanwhile, the switching unit 400 is comprised of twenty-four switches 410. As shown in FIG. 1, the plurality of switches 410 are respectively disposed between the twenty-four I/Q channel correlators 120 and the twenty-four $N_{NC2}N_S$ tap I/Q channel symbol matched filters 310. The switches 410 change an opened state of the first search process to a closed state of the second search process to connect the twenty-four I/Q channel correlators 120 with the twenty-four $N_{NC2}N_S$ tap I/Q channel symbol matched filters 310.

Further, the super frame and symbol boundary time deciding unit 500 uses the output values $(X_n(i))$ of the twenty-four $N_{NC2}N_S$ tap I/Q channel symbol matched filters 310 in the second search process to decide the super frame time (packet synchronization) and the symbol boundary time (firstly received path)

At this time, the super frame and symbol boundary time deciding unit 500 decides the super frame time (packet synchronization) as follows. That is, a summation $(Q_n)$ of the output values $(X_n(i))$ of the twenty-four $N_{NC2}N_S$ tap I/Q channel symbol matched filters 310 is compared with a threshold value $(\theta_s)$ at an arbitrary $n_{th}$ symbol time position. As a comparative result, if the summation $(Q_n)$ of the output values $(X_n(i))$ exceeds the threshold value $(\theta_s)$, it is determined that the super frame time (packet synchronization) is successfully acquired, to decide the $n_{th}$ symbol time position as the super frame time (packet synchronization).

Here, the summation ($Q_n$) of the output values ($X_n(i)$) can be calculated at the arbitrarily $n_{th}$ symbol time position in the following Equation 5:

$$Q_n = \sum_{i=1}^{24} X_n(i), n = 0, 1, 2 \ldots \quad \text{[Equation 5]}$$

Meanwhile, the super frame and symbol boundary time deciding unit 500 decides the symbol boundary time (firstly received path) as follows. That is, the code phase consistent with a maximal one of the output values ($X_n(i)$) of the twenty-four $N_{NC2}N_S$ tap I/Q channel symbol matched filters 310 is decided as the symbol boundary time (firstly received path).

Figure 3:
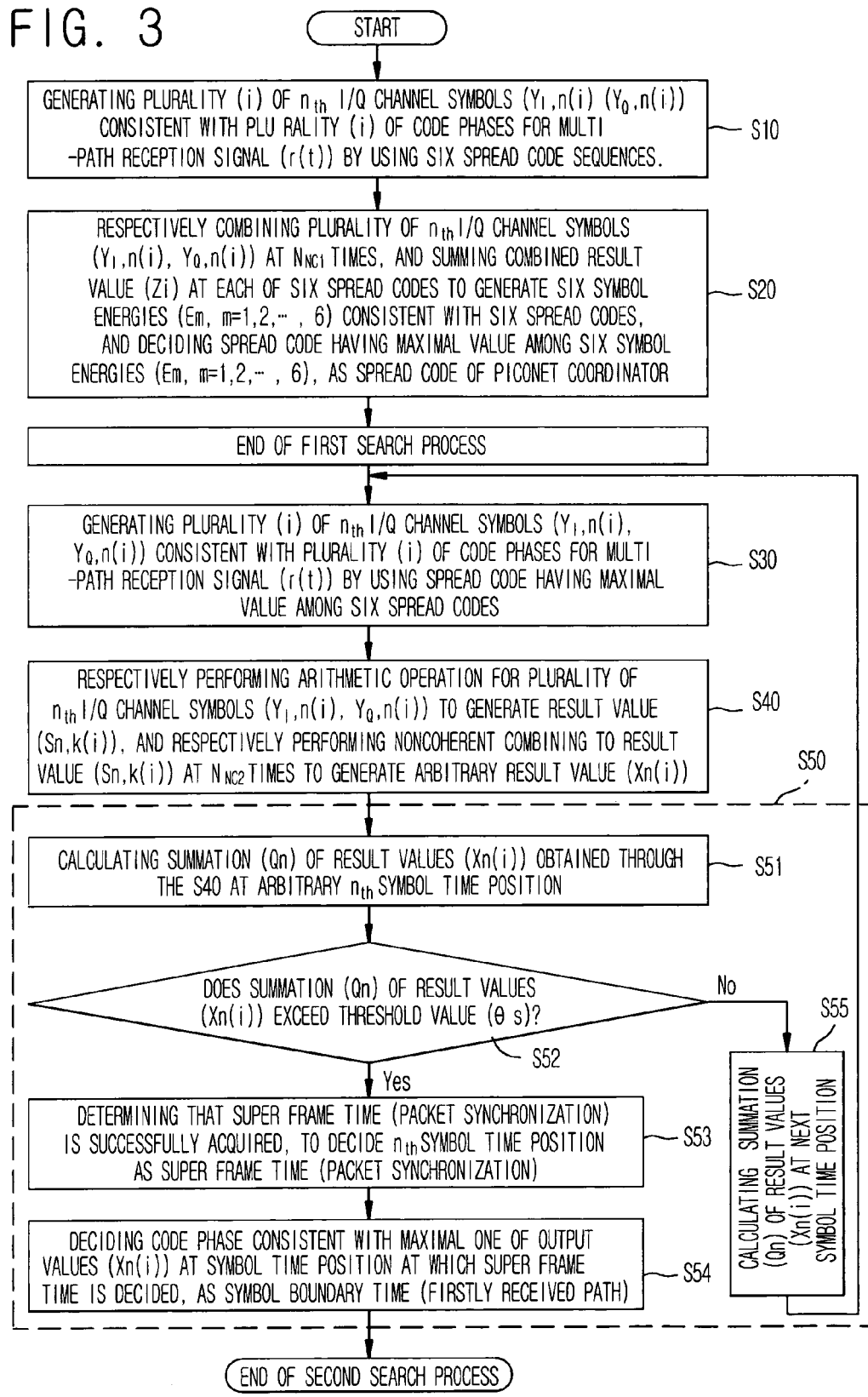
FIG. 3 is a flowchart illustrating a code acquisition method using a two-step search process in a DS-CDMA UWB modem according to a preferred embodiment of the present invention.

If so, a code acquisition method using the two-step search process in the DS-CDMA UWB modem is described with reference to the attached drawings. At this time, FIG. 3 is a flowchart illustrating the code acquisition method using the two-step search process in the DS-CDMA UWB modem according to a preferred embodiment of the present invention.

First, the I/Q channel symbol generating unit 100 uses the six spread code sequences of FIG. 4 to generate the twenty-four $n_{th}$ I/Q channel symbols ($Y_{I,n}(i)$, $Y_{Q,n}(i)$) consistent with the twenty-four code phases for the multi-path reception signal ($r(t)$) (S10).

If so, the spread code selecting unit 200 respectively combines the twenty-four $n_{th}$ I/Q channel symbols ($Y_{I,n}(i)$, $Y_{Q,n}(i)$) at $N_{NC1}$ times, and then sums the combined result value ($Z_i$, i=1, 2, . . . ,24) at each of the six spread codes to generate the six symbol energies ($E_m$, m=1,2, . . . , 6) consistent with the six spread codes, and then decides the spread code having the maximal value among the six symbol energies ($E_m$, m=1,2, . . . , 6), as the spread code of the piconet coordinator (S20).

At this time, the result value ($Z_i$) obtained by combining the twenty-four $n_{th}$ I/Q channel symbols ($Y_{I,n}(i)$, $Y_{Q,n}(i)$) at $N_{NC1}$ times in the S20 can be calculated in the equation 1, and the symbol energies ($E_m$, m=1,2, . . . , 6) consistent with the six spread codes can be calculated in the equation 2.

The I/Q channel symbol generating unit 100 uses the spread code having the maximal value among the six spread codes acquired through the S20, to generate the twenty-four $n_{th}$ I/Q channel symbols ($Y_{I,n}(i)$, $Y_{Q,n}(i)$) consistent with the twenty-four code phases for the multi-path reception signal ($r(t)$) (S30).

If so, the $N_{NC2}N_S$ tap I/Q channel symbol matched filter unit 300 performs the coherent summation(combining) of the $N_s$ number of symbols of the twenty-four $n_{th}$ I/Q channel symbols ($Y_{I,n}(i)$, $Y_{Q,n}(i)$) to generate the result value ($S_{n,k}(i)$), and then performs the noncoherent combining to the result value ($S_{n,k}(i)$) at $N_{NC2}$ times to output the arbitrary result value ($X_n(i)$) (S40).

At this time, the result value ($S_{n,k}(i)$) of the arithmetic processing of the S40 can be calculated in the Equation 3, and the result value ($X_n(i)$) of the noncoherenet combining can be calculated in the Equation 4.

Meanwhile, the super frame and symbol boundary time deciding unit 500 uses the output values ($X_n(i)$) obtained through the S40, to decide the super frame time (packet synchronization) and the symbol boundary time (firstly received path).

At this time, in a detailed description of the S50, the super frame and symbol boundary time deciding unit 500 calculates the summation ($Q_n$) of the output values ($X_n(i)$) at the $n_{th}$ symbol time position (S51). Here, the summation ($Q_n$) of the output values ($X_n(i)$) at the $n_{th}$ symbol time position can be calculated in the Equation 5.

After that, the super frame and symbol boundary time deciding unit 500 determines whether or not the summation ($Q_n$) of the output values ($X_n(i)$) exceeds the threshold value ($\theta_s$) (S52).

At this time, if it is determined in the S52 that the summation ($Q_n$) of the output values ($X_n(i)$) at the $n_{th}$ symbol time position exceeds the threshold value ($\theta_s$) (YES), the super frame and symbol boundary time deciding unit 500 determines that the super frame time (packet synchronization) is successfully acquired, to decide the $n_{th}$ symbol time position as the super frame time (packet synchronization) (S53).

After that, the super frame and symbol boundary time deciding unit 500 decides the code phase consistent with the maximal one of the output values ($X_n(i)$) at the symbol time position at which the super frame time is decided, as the symbol boundary time (firstly received path).

On the contrary, if it is determined in the S52 that the summation ($Q_n$) of the output values ($X_n(i)$) obtained in the S40 at the $n_{th}$ symbol time position does not exceed the threshold value ($\theta_s$) (NO), the super frame and symbol boundary time deciding unit 500 calculates the summation ($Q_n$) of the result values ($X_n(i)$) at a next symbol time position and again returns to the S52 (S55).

As described above, the code acquisition device and method using the two-step search process in the DS-CDMA UWB modem according to the present invention has an excellent effect in that, when the beacon frame synchronization being the super frame timing synchronization is performed, the twenty-four noncoherent correlators are used in the first search process to search the allocation code allocated to the piconet, and the spread code sequence searched in the first search process is used in the second search process to concurrently decide the super frame time (packet code) and the symbol boundary time (firstly received path), thereby allowing the communication between the device belonging to the piconet and the piconet coordinator.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A code acquisition device using a two-step search process in a Direct Sequence-Code Division Multiple Access (DS-CDMA) Ultra Wide Band (UWB) modem, the device comprising:

an I/Q channel symbol generating unit for, in a first search process, generating a plurality (i) of $n_{th}$ I/Q channel symbols ($Y_{I,n}(i)$, $Y_{Q,n}(i)$) consistent with a plurality (i) of code phases for a multi-path reception signal ($r(t)$) by using six spread code sequences, and in a second search process, generating a plurality of $n_{th}$ I/Q channel symbols ($Y_{I,n}(i)$, $Y_{Q,n}(i)$) consistent with a plurality (i) of code phases for the multi-path reception signal ($r(t)$) by using a spread code having a maximal value among six spread codes acquired in the first search process;

a spread code selecting unit for, in the first search process, receiving the plurality of $n_{th}$ I/Q channel symbols ($Y_{I,n}(i)$, $Y_{Q,n}(i)$) from the I/Q channel symbol generating unit to respectively combine the received channel symbols ($Y_{I,n}(i)$, $Y_{Q,n}(i)$) at $N_{NC1}$ times, and summing a respective combined result value ($Z_i$) at each of the six spread codes to generate six symbol energies (Em, m=1,2, . . . , 6) consistent with the six spread codes, and deciding the spread code having a maximal value among the six symbol energies (Em, m=1,2, . . . , 6), as a spread code of a piconet coordinator;

an $N_{NC2}N_S$ tap I/Q channel symbol matched filter unit having an Ns-length tap and for, in the second search process, receiving the plurality (i) of nth I/Q channel symbols ($Y_{I,n}(i)$, $Y_{Q,n}(i)$) from the I/Q channel symbol generating unit to generate a result value ($S_{n,k}(i)$) through a predetermined arithmetic operation, and performing a noncoherent combining to the result value ($S_{n,k}(i)$) at $N_{NC2}$ times to output an arbitrary result value ($X_n(i)$);

a switching unit disposed between the I/Q channel symbol generating unit and the $N_{NC2}N_S$ tap I/Q channel symbol matched filter unit, for changing an opened state of the first search process to a closed state of the second search process to connect the I/Q channel symbol generating unit with the $N_{NC2}N_S$ tap I/Q channel symbol matched filter unit; and a super frame and symbol boundary time deciding unit for deciding a super frame time and a symbol boundary time by using the output values ($X_n(i)$) of the plurality of $N_{NC2}N_S$ tap I/Q channel symbol matched filters in the second search process.

2. The device of claim 1, wherein the I/Q channel symbol generating unit comprises:

a plurality (i) of multipliers for respectively multiplying the multi-path reception signal (r(t)), which is sequentially delayed by one PN chip period (Tc), by the six spread code sequences in the first search process; and a plurality (i) of I/Q channel coherent correlators for, in the first search process, respectively generating the plurality of $n_{th}$ I/Q channel symbols ($Y_{I,n}(i)$, $Y_{Q,n}(i)$) consistent with the plurality (i) of code phases on the basis of result values of the plurality (i) of multipliers, and in the second search process respectively generating the plurality of nth I/Q channel symbols ($Y_{I,n}(i)$, $Y_{Q,n}(i)$) consistent with the plurality (i) of code phases for the multi-path reception signal (r(t)) by using the spread code acquired through the spread code selecting unit in the first search process.

3. The device of claim 2, wherein the multi-path reception signal (r(t)) and the code phases, which are consistent with the plurality (i) of I/Q channel coherent correlators, have a relation wherein the code phases are allocated to from a remainder of the plurality of (i) I/Q channel coherent correlators which include a second (i) I/Q channel coherent correlator to a last (i) I/Q channel coherent correlator, and are in sequentially delayed by one PN chip period (Tc), with respect to of the code phase of a path received at the first I/Q channel coherent correlator.

4. The device of claim 2, wherein the plurality (i) of I/Q channel coherent correlators have a parallel structure.

5. The device of claim 1, wherein the spread code selecting unit comprises:

a plurality (i) of symbol energy generators for, in the first search process, respectively receiving the plurality (i) of $n_{th}$ I/Q channel symbols ($Y_{I,n}(i)$, $Y_{Q,n}(i)$) from the I/Q channel symbol generating unit to combine the received channel symbols ($Y_{I,n}(i)$, $Y_{Q,n}(i)$) at $N_{NC1}$ times and respectively output the combined result value (Zi); and a maximum-value spread code deciding unit for summing the result value (Zi) of the plurality (i) of symbol energy generators at each of the six spread codes to generate the symbol energies (Em, m=1,2, . . . , 6) consistent with the six spread codes, and deciding the spread code having the maximal value among the six symbol energies (Em, m=1,2, . . . , 6), as the spread code of the piconet coordinator.

6. The device of claim 5, wherein the result value (Zi) of the plurality (i) of symbol energy generators can be calculated in the following Equation:

$$\sum_{n=1}^{N_{ncl}} [Y_{I,n}^2(i) + Y_{Q,n}^2(i)](i = 1, 2, \ldots, 24).$$

7. The device of claim 5, wherein the symbol energies (Em, m=1,2, . . . , 6) consistent with the six spread codes generated through the maximum-value spread code deciding unit can be calculated in the following Equation:

$$E_m = \sum_{i=1}^{24} Z_i (m = 1, 2, \ldots, 6).$$

8. The device of claim 1, wherein the $N_{NC2}N_S$ tap I/Q channel symbol matched filter unit is comprised of a plurality (i) of $N_{NC2}N_S$ tap I/Q channel symbol matched filters having the Ns-length tap and for receiving the plurality of $n_{th}$ I/Q channel symbols ($Y_{I,n}(i)$, $Y_{Q,n}(i)$) from the I/Q channel symbol generating unit to respectively generate the result value ($S_{n,k}(i)$) through a coherent summation of Ns number of symbols, and respectively performing the noncoherent combining to the result value ($S_{n,k}(i)$) at $N_{NC2}$ times to generate an arbitrary result value (Xn(i)).

9. The device of claim 8, wherein the plurality (i) of $N_{NC2}N_S$ tap I/Q channel symbol matched filters respectively comprises:

a reception symbol forming unit for receiving the $n_{th}$ I/Q channel symbol ($Y_{I,n}(i)$, $Y_{Q,n}(i)$), and eliminating a sign component stored in the Ns number of the taps by using a preamble symbol designated to the Ns-length tap, thereby forming the Ns number of reception symbols; and an arithmetic processing unit for obtaining the coherent summation of the Ns number of reception symbols of the reception symbol forming unit, and multiplying the obtained coherent summation by an I/Q channel component and summing the multiplied result to output the result value ($S_{n,k}(i)$), thereby eliminating an effect of a phase component.

10. The device of claim 9, wherein since the $N_{NC1}$, $N_S$, $N_{NC2}$ values are lengths of coherent summation, they are selected as optimal values by performing a performance simulation depending on a channel environment in consideration of a frequency error, a probability of signal detection and a code acquisition time.

11. The device of claim 9, wherein the result value ($S_{n,k}(i)$) of the arithmetic processing unit can be calculated in the following Equation:

$$S_{n,k}(i) = \left(\sum_{m=1}^{N_S} Y_{I,n-mk}(i)\right)^2 + \left(\sum_{m=1}^{N_S} Y_{Q,n-mk}(i)\right)^2,$$

$$i = 1, 2, \ldots 24, k = 1, 2, \ldots, N_{NC2}.$$

12. The device of claim 8, wherein each result value ($X_n(i)$) of the plurality of $N_{NC2}N_S$ tap I/Q channel symbol matched filters can be calculated in the following Equation:

$$X_n(i) = \sum_{k=1}^{N_{NC2}} \left[\left(\sum_{m=1}^{N_S} Y_{I,n-mk}(i)\right)^2 + \left(\sum_{m=1}^{N_S} Y_{Q,n-mk}(i)\right)^2\right], i = 1, 2, \ldots, 24.$$

13. The device of claim 1, wherein the super frame and symbol boundary time deciding unit decides the super frame time in such a manner that a summation (Qn) of the output values ($X_n(i)$) of the $N_{NC2}N_S$ tap I/Q channel symbol matched filter unit is compared with a threshold value ($^\theta S$) at an arbitrary nth symbol time position so that if it is determined that the summation (Qn) of the output values ($X_n(i)$) of the $N_{NC2}N_S$ tap I/Q channel symbol matched filter unit exceeds the threshold value ($^\theta S$), it is determined that the super frame time is successfully acquired, to decide the nth symbol time position as the super frame time.

14. The device of claim 13, wherein the summation (Qn) of the output values ($X_n(i)$) of the $N_{NC2}N_S$ tap I/Q channel symbol matched filter unit can be calculated at the arbitrarily $n_{th}$ symbol time position in the following Equation:

$$Q_n = \sum_{i=1}^{24} X_n(i), n = 0, 1, 2.$$

15. The device of claim 1, wherein the super frame and symbol boundary time deciding unit decides a symbol boundary time in such a manner that the code phase consistent with a maximal one of the output values ($X_n(i)$) of the $N_{NC2}N_S$ tap I/Q channel symbol matched filter unit is decided as the symbol boundary time.

16. A code acquisition method using a two-step search process in a Direct Sequence-Code Division Multiple Access (DS-CDMA) Ultra Wide Band (UWB) modem, the method comprising:

a step 10 of generating a plurality (i) of $n_{th}$ I/Q channel symbols ($Y_{I,n}(i)$, $Y_{Q,n}(i)$) consistent with a plurality (i) of code phases for a multi-path reception signal (r(t)) by using six spread code sequences;

a step 20 of respectively combining the plurality of $n_{th}$ I/Q channel symbols ($Y_{I,n}(i)$, $Y_{Q,n}(i)$) at $N_{NC1}$ times, and summing a respective combined result value (Zi) at each of six spread codes to generate six symbol energies (Em, m=1,2, ..., 6) consistent with the six spread codes, and deciding the spread code having a maximal value among the six symbol energies (Em, m=1, 2, ..., 6), as a spread code of a piconet coordinator;

a step 30 of generating a plurality (i) of $n_{th}$ I/Q channel symbols ($Y_{I,n}(i)$, $Y_{Q,n}(i)$) consistent with a plurality (i) of code phases for the multi-path reception signal (r(t)) by using the spread code having the maximal value among the six spread codes;

a step 40 of respectively performing an arithmetic operation for the plurality of $n_{th}$ I/Q channel symbols ($Y_{I,n}(i)$, $Y_{Q,n}(i)$) to generate a result value ($S_{n,k}(i)$), and respectively performing a noncoherent combining to the result value ($S_{n,k}(i)$) at $N_{NC2}$ times to generate an arbitrary result value (Xn(i)); and a step 50 of deciding a super frame time and a symbol boundary time by using the generated result value (Xn(i)) obtained through the step 40.

17. The method of claim 16, wherein in the step 20, the result value ($Z_i$) obtained by respectively combining the plurality of $n_{th}$ I/Q channel symbols ($Y_{I,n}(i)$, $Y_{Q,n}(i)$) at $N_{NC1}$ times can be calculated in the following Equation:

$$\sum_{n=1}^{N_{nc1}} [Y_{I,n}^2(i) + Y_{Q,n}^2(i)](i = 1, 2, \ldots, 24).$$

18. The method of claim 16, wherein in the step 20, the symbol energies (Em, m=1, 2, ..., 6) consistent with the six spread codes can be calculated in the following Equation:

$$E_m = \sum_{i=1}^{24} Z_i (m = 1, 2, \ldots, 6).$$

19. The method of claim 16, wherein in the step 40, the result value ($S_{n,k}(i)$) of the arithmetic operation can be calculated in the following Equation:

$$S_{n,k}(i) = \left(\sum_{m=1}^{N_S} Y_{I,n-mk}(i)\right)^2 + \left(\sum_{m=1}^{N_S} Y_{Q,n-mk}(i)\right)^2,$$

$$i = 1, 2, \ldots 24, k = 1, 2, \ldots, N_{NC2}.$$

20. The method of claim 16, wherein in the step 40, the result value (Xn(i)) of the noncoherent combining can be calculated in the following Equation:

$$X_n(i) = \sum_{k=1}^{N_{NC2}} \left[\left(\sum_{m=1}^{N_S} Y_{I,n-mk}(i)\right)^2 + \left(\sum_{m=1}^{N_S} Y_{Q,n-mk}(i)\right)^2\right], i = 1, 2, \ldots, 24.$$

21. The method of claim 16, wherein the step 50 comprises:

a step 51 of calculating a summation (Qn) of the result values (Xn(i)) obtained through the step 40 at an arbitrary $n_{th}$ symbol time position;

a step 52 of determining whether or not the summation (Qn) of the result values (Xn(i)) exceeds a threshold value ($^\theta S$);

a step 53 of if it is determined in the step 52 that the summation (Qn) of the result values (Xn(i)) exceeds the threshold value ($^\theta$s), it is determined that the super frame time is successfully acquired, to decide the $n_{th}$ symbol time position as the super frame time; and a step 54 of deciding the code phase consistent with a maximal one of the output values (Xn(i)) at the symbol time position at which the super frame time is decided, as the symbol boundary time.

22. The method of claim 21, further comprising a step 55 of calculating a summation (Qn) of the result values (Xn(i)) at a next symbol time position and returning to the step 52 if it is determined in the step 51 that the summation (Qn) of the output values (Xn(i)) at the $n_{th}$ symbol time position does not exceed the threshold value ($^\theta$s).

23. The method of claim 21, wherein the summation (Qn) of the output values (Xn(i)) can be calculated at the nth symbol time position in the following Equation:

$$Q_n = \sum_{i=1}^{24} X_n(i), n = 0, 1, 2.$$

* * * * *